(No Model.)
D. BROWN.
STOPPING DEVICE FOR MACHINES FOR GRADING AND REELING STRAW BRAID.
No. 425,204. Patented Apr. 8, 1890.
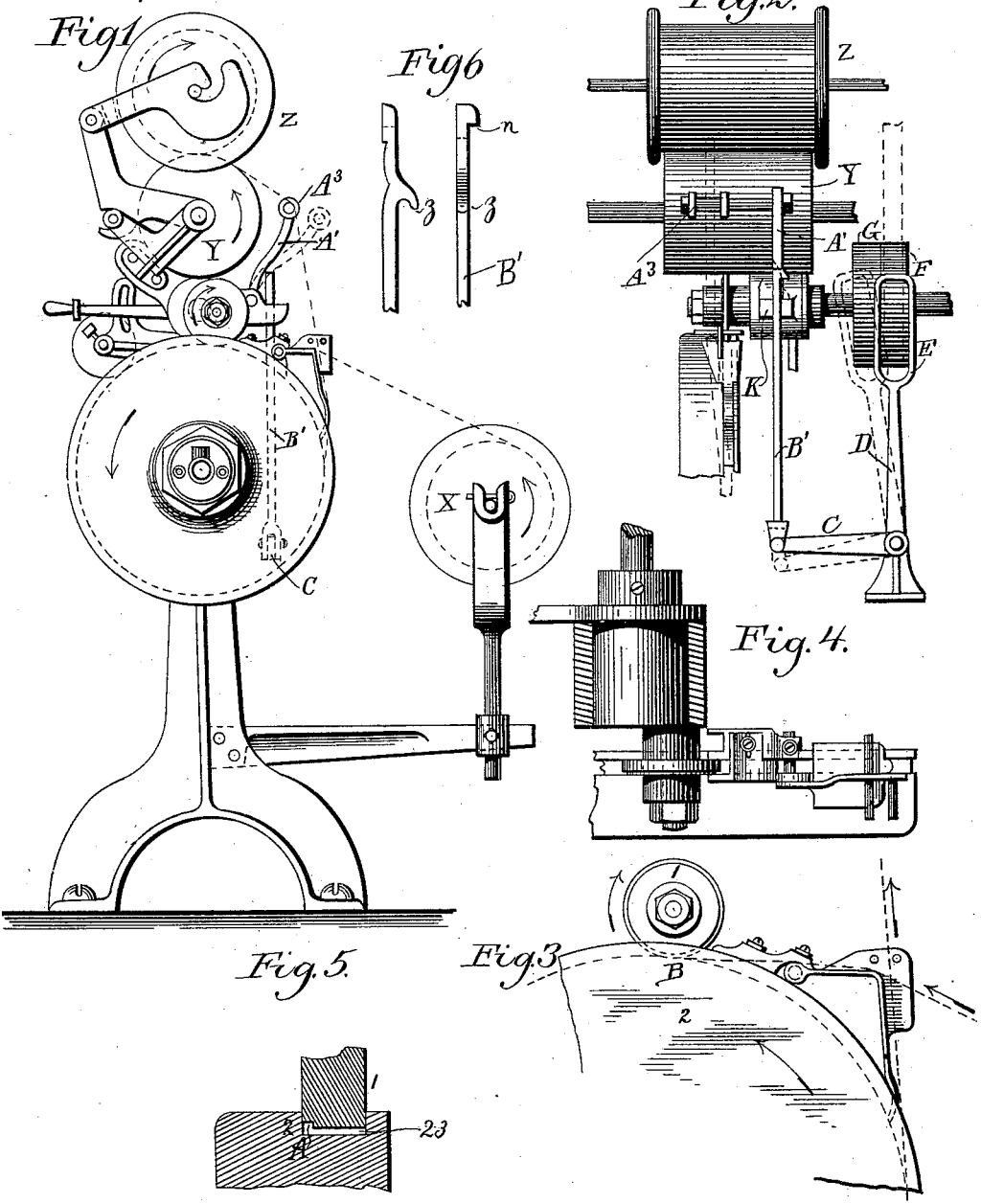
Witnesses:
Daniel Sumner Farrington
J. E. Carpenter
Inventor
Daniel Brown

UNITED STATES PATENT OFFICE.

DANIEL BROWN, OF WRENTHAM, MASSACHUSETTS.

STOPPING DEVICE FOR MACHINES FOR GRADING AND REELING STRAW BRAID.

SPECIFICATION forming part of Letters Patent No. 425,204, dated April 8, 1890.

Application filed September 14, 1889. Serial No. 323,980. (No model.)

*To all whom it may concern:*

Be it known that I, DANIEL BROWN, a citizen of the United States, residing at Wrentham, in the county of Norfolk and Commonwealth of Massachusetts, have invented a new and useful Improvement in Stopping Devices for Machines for Grading and Reeling Straw Braid or for Similar Machines, of which the following is a specification.

My invention has for its object to stop the machine whenever the braid breaks or the supply thereof runs out.

In the accompanying drawings I have shown my invention applied to a machine of the type shown and described in my United States Letters Patent No. 395,734.

In the said drawings, Figure 1 is a side view of a machine for grading and reeling straw braid, showing my invention applied thereto. Fig. 2 is a front view of a portion thereof. Figs. 3 and 4 are side and plan views, respectively, showing details, Fig. 4 being partly in section. Fig. 5 is a sectional view showing the meeting portions of the steam-drum and pressure-roller. Fig. 6 shows views of a detail of the stopping mechanism.

1 is the pressure-roller; 2, the steam-drum; X, the supply spool or reel; Z, the receiving spool or reel; Y, a friction-drum on which the spool Z rests; F, the fast or driving pulley, and G the loose pulley, all of these parts being constructed and arranged as in the patent aforesaid. The braid passes from the spool X between the roller 1 and steam-drum 2, and after going around the latter proceeds to the spool Z.

In machines as at present constructed there is nothing to prevent the machine from going on with its motion after the braid has broken or the supply thereof has run out. In order to stop the machine automatically under such circumstances, I employ the following devices: $A^3$ is a pin or roller supported by an arm A', which is pivoted to the machine-frame. In going from the steam-drum 2 to the spool Z the braid passes in front of the said pin or roller and holds it in the position in which it is represented in full lines in Fig. 1 so long as the braid continues to travel through the machine. Into proximity to the arm A' and in front thereof extends the upper end of a rod B', which at its lower end is jointed to the extremity of a horizontal arm C, connected with the belt-shifter D, through the loop E of which the driving-belt passes. On its rear edge the rod B' is provided with a hook $z$, which, when the rod B' has been raised to the position shown in full lines in Fig. 2, rests upon the upper side of a portion K of the machine-frame, thereby retaining the belt-shifter in position to keep the driving-belt on the fast pulley F. When the braid breaks or runs out, the arm A' falls and strikes the upper end of the rod B', moving it slightly forward, so as to disengage the catch $z$ from the supporting portion of the frame-work, whereupon the rod B' and arm C are driven by the said arm A' into the position represented by dotted lines in Fig. 2, and the belt-shifter is moved so as to shift the belt onto the loose pulley. A shoulder $n$ on the upper end of the rod B' prevents the said rod from descending too far.

I have herein shown the pressure-roller 1, which presses the braid into the groove 23 in the face of the steam-drum 2 as formed with a rectangular recess A, produced by cutting a groove in one edge of the pressure-roller all the way around the circumference of the roller. Into this recess a portion of the braid enters, forming upon the braid a raised edge. However, I do not herein claim this construction of the pressure-roller.

Having described my invention and the manner of reducing the same to practice, I claim—

The combination of the arm A' and its pin or roller with the upright rod, the horizontal arm C, and the belt-shifter, substantially as described.

DANIEL BROWN.

Witnesses:
ROBERT R. TATE,
SAMUEL A. WING.